(12) United States Patent
Rezvani et al.

(10) Patent No.: US 8,619,887 B2
(45) Date of Patent: Dec. 31, 2013

(54) ADJUSTABLE OPERATIONAL STATE WIRELESS MIMO

(75) Inventors: Behrooz Rezvani, San Ramon, CA (US); Farrokh R. Farrokhi, San Ramon, CA (US); Sam Heidari, Los Altos Hills, CA (US)

(73) Assignee: Quantenna Communications, Inc., Fremont, CA (US)

( * ) Notice: Subject to any disclaimer, the term of this patent is extended or adjusted under 35 U.S.C. 154(b) by 244 days.

(21) Appl. No.: 13/120,419

(22) PCT Filed: Sep. 23, 2009

(86) PCT No.: PCT/US2009/058091
§ 371 (c)(1),
(2), (4) Date: Aug. 18, 2011

(87) PCT Pub. No.: WO2010/039550
PCT Pub. Date: Apr. 8, 2010

(65) Prior Publication Data
US 2011/0293027 A1    Dec. 1, 2011

Related U.S. Application Data

(60) Provisional application No. 61/099,492, filed on Sep. 23, 2008, provisional application No. 61/099,496, filed on Sep. 23, 2008.

(51) Int. Cl.
*H04K 1/10* (2006.01)

(52) U.S. Cl.
USPC ........... 375/260; 375/232; 375/267; 455/101; 455/522

(58) Field of Classification Search
USPC .......................................... 375/260, 267, 232
See application file for complete search history.

(56) References Cited

U.S. PATENT DOCUMENTS

| | | | |
|---|---|---|---|
| 2006/0083195 | A1 | 4/2006 | Forenza et al. |
| 2006/0246852 | A1 | 11/2006 | Nakao |
| 2007/0064830 | A1* | 3/2007 | Choi et al. ..................... 375/267 |
| 2007/0070925 | A1 | 3/2007 | Sydir et al. |
| 2007/0099578 | A1 | 5/2007 | Adeney et al. |
| 2008/0080634 | A1* | 4/2008 | Kotecha et al. ............... 375/267 |
| 2008/0219341 | A1* | 9/2008 | Kim .............................. 375/232 |

FOREIGN PATENT DOCUMENTS

WO      200203568  A1    1/2002

OTHER PUBLICATIONS

Invitation to Pay Additional Fees and, where applicable, Protest Fee for International Application PCT/US2009/058091, mailed Jun. 28, 2010, 7 pages.

* cited by examiner

*Primary Examiner* — Chieh Fan

(57) ABSTRACT

Wireless devices capable of one or more of extended multiple input multiple output (MIMO), dual bonded, and dual concurrent operation are disclosed. Methods for switching between the operational states for wireless devices capable of multiple operational states are also disclosed.

19 Claims, 10 Drawing Sheets

ADJUSTABLE OPERATIONAL STATE WIRELESS MIMO

CROSS-REFERENCE TO RELATED APPLICATIONS

This application is a National Stage Application under 35 U.S.C. 371 of PCT No. PCT/US2009/058091 filed: Sep. 23, 2009.

PCT/US2009/058091 claims the benefit of prior filed Provisional Application No. 61/099,492 filed on Sep. 23, 2008 and Provisional Application No. 61/099,496 filed on Sep. 23, 2008 all of which, including the above referenced PCT application, are incorporated herein by reference in their entirety as if fully set forth herein.

BACKGROUND

Multiple input multiple output (MIMO) wireless communications is an active field of research and development. Normally a wireless device will have an antennae array that operates in association with a MIMO signal processing unit. A wireless network cannot normally accommodate multiple different wireless devices with different numbers of antennae and frequencies. (It may be possible to establish communications between a first wireless device with a first number of antennae and a second wireless device with a second, lower number of antennae, but this will typically degrade performance.) So wireless devices are usually designed for operation within relatively specific operational parameters.

SUMMARY

The following is described and illustrated in conjunction with systems, tools, and methods that are meant to be exemplary and illustrative, not limiting in scope. In various embodiments, one or more of the above-described problems have been reduced or eliminated, while other embodiments are directed to other improvements.

Wireless devices capable of one or more of extended multiple input multiple output (MIMO), dual bonded, and dual concurrent operation are disclosed. Methods for switching between the operational states for wireless devices capable of multiple operational states are also disclosed.

BRIEF DESCRIPTION OF THE DRAWINGS

Examples of the claimed subject matter are illustrated in the figures.

DETAILED DESCRIPTION

In the following description, several specific details are presented to provide a thorough understanding of examples of the claimed subject matter. One skilled in the relevant art will recognize, however, that one or more of the specific details can be eliminated or combined with other components, etc. In other instances, well-known implementations or operations are not shown or described in detail to avoid obscuring aspects of the claimed subject matter.

Figure 1:
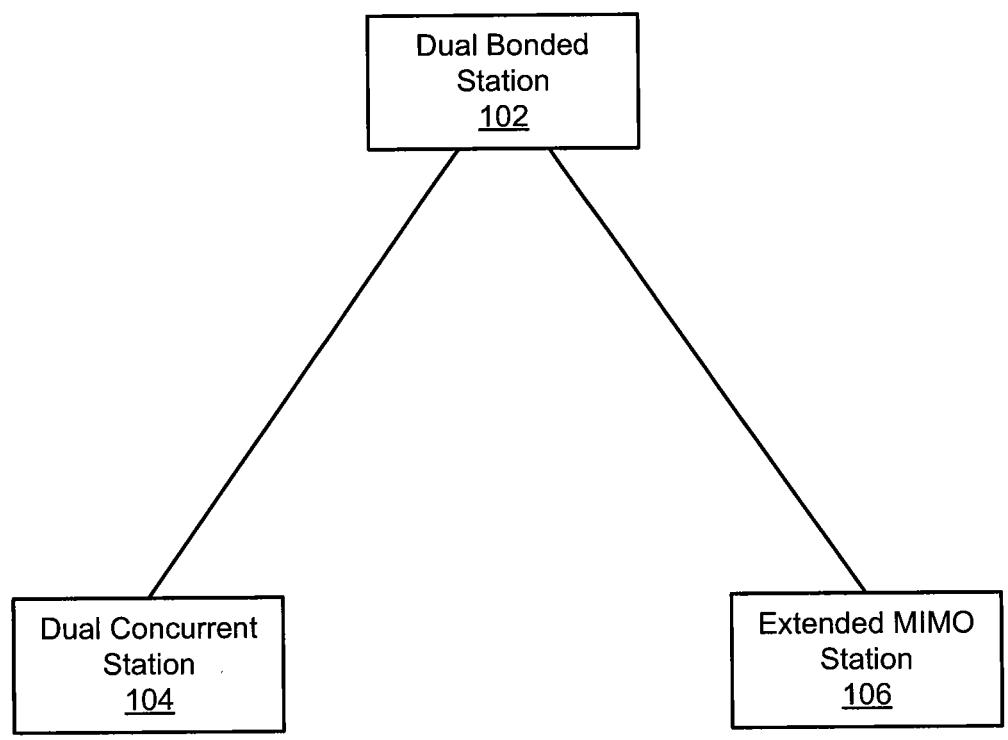
FIG. 1 depicts an example of a wireless system that includes both extended MIMO and dual transmission state stations.

FIG. 1 depicts an example of a wireless system 100 that includes both extended MIMO and dual transmission state stations. In the example of FIG. 1, the system 100 includes a dual bonded station 102, a dual concurrent station 104, and an extended multiple input multiple output (MIMO) station 106. The stations are depicted in a generic fashion such that the system 100 could illustrate a portion of an ad-hoc wireless network, or zero or more of the stations could be an access point (AP) and zero or more of the stations could be a non-AP station.

A station, as used in this paper, may be referred to as a device with a media access control (MAC) address and a physical layer (PHY) interface to a wireless medium that complies with the IEEE 802.11 standard. In alternative embodiments, a station may comply with a different standard than IEEE 802.11, or no standard at all, may be referred to as something other than a "station," and may have different interfaces to a wireless or other medium. IEEE 802.11a-1999, IEEE 802.11b-1999, IEEE 802.11g-2003, IEEE 802.11-2007, and IEEE 802.11n TGn Draft 8.0 (2009) are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents.

In the example of FIG. 1, the system 100 includes each of 3 types of stations that will be discussed in this paper, dual bonded, dual concurrent, and extended MIMO. However, it should be noted that in a specific implementation, utilizing techniques described in this paper, it could appear that all of the stations of a wireless system are of the same type because they are operating in the same transmission and/or receive state, or there could be represented only two of the three types of stations.

It may be desirable to implement a smart multi-antennae device that has many RX antennae/RF due to downstream throughput demand, but only one TX antenna/RF path. A device such as this may select the best antenna from the receive antennae pool based upon the analysis done for the quality of a received signal in each receive antenna, due to the fact that channel is in general identical in each direction.

Figure 2:
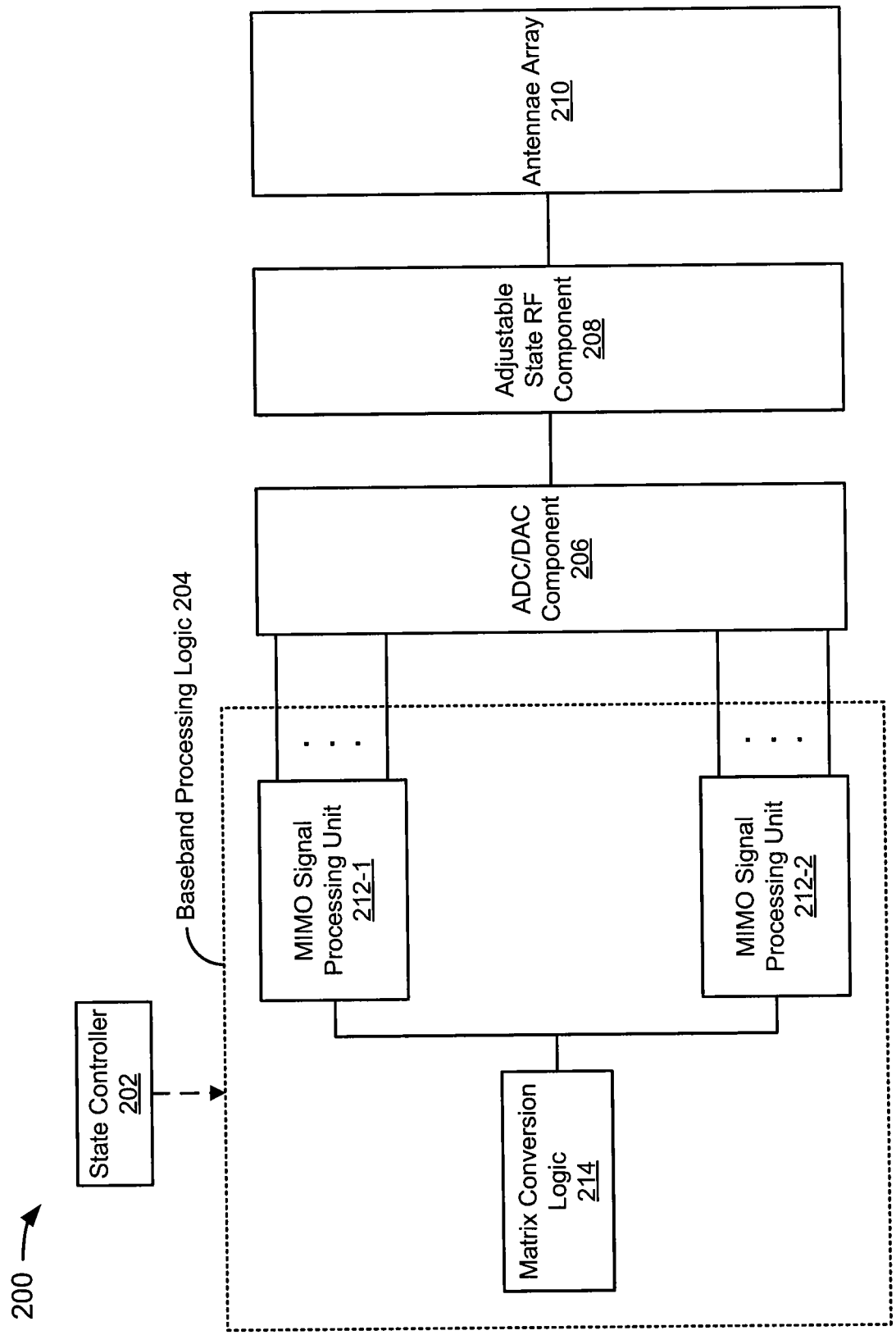
FIG. 2 depicts an example of an extended MIMO system.

FIG. 2 depicts an example of an extended MIMO system 200. In the example of FIG. 2, the system 200 includes a state controller 202, baseband processing logic 204, an analog-to-digital converter (ADC)/digital-to-analog converter (DAC) component 206, an adjustable state radio frequency (RF) component 208, and an antennae array 210.

In the example of FIG. 2, the state controller 202 is an engine that provides state control to the baseband processing logic 204. When components of the system 200 make reference to controlling state or a control signal, it can be assumed that the state controller 202 provides the control signal to control state. As used in this paper, an engine includes a dedicated or shared processor and, hardware, firmware, or software modules that are executed by the processor. Depending upon implementation-specific or other considerations, an engine can be centralized or its functionality distributed. An engine can include special purpose hardware, firmware, or software embodied in a computer-readable medium for execution by the processor. As used in this paper, the term "computer-readable storage medium" is intended to include only physical media, such as memory. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

In the example of FIG. 2, the baseband processing logic 204 includes MIMO signal processing unit 212-1 and MIMO signal processing unit 212-2 (collectively MIMO signal processing units 212) and matrix conversion logic 214.

In the example of FIG. 2, the MIMO signal processing units 212 can be implemented as N×N. In various embodiments, the value of N can be 4, 6, 8, 12, and 16. Extended MIMO operation would enable the use of up to 2N antennae in communication with another similarly equipped wireless system. It should be noted that extended MIMO systems can communicate with other wireless systems even if the systems do not have the same number of antennae, but some of the antennae of one of the stations might not be utilized, reducing optimal performance.

In the example of FIG. 2, the matrix conversion logic 214 can be implemented using a high speed internal bus. For example, the matrix conversion logic 214 can utilize a high speed bus to extract intermediate processing results from each one of the MIMO signal processing units 212 to create a 2N×2N MIMO operation from the internal values of each of the (N×N, in this example) MIMO signal processing units 212. As another example, the matrix conversion logic 214 extracts intermediate results from each of the MIMO signal processing units 212, processes the information and sends it back to each unit for further processing and repeats the process in order to create 2N×2N MIMO operation. An example of this operation is, but not limited to, the implementation of an 8×8 Direct Matrix using 4×4 DMI elementary blocks or implementing an 8×8 Minimum Mean Square (MMSE) operation using 4×4 MMSE operations.

In a specific implementation, the MIMO signal processing units 212 are modular such that they can be produced efficiently and used separately or assembled using matrix conversion logic as shown in the example of FIG. 2.

Modular MIMO signal processing units, as used in this paper, are "modular" by virtue of being designed as discrete units. For example, a module MIMO signal processing unit could be designed, by way of example but not limitation, on a chip, as an application-specific integrated circuit (ASIC), a digital signal processor (DSP), a field-programmable gate array (FPGA), or in some other applicable known or convenient package. It may be noted that the desirability of providing modular MIMO signal processing units for use with a system such as depicted in the example of FIG. 2 can depend upon the market for the modular MIMO signal processing units. For example, if there is a large (e.g., 95%) demand for discrete modular MIMO signal processing units for use outside of an extended MIMO system, it may be more cost-effective to simply produce the baseband processing logic 204 for the extended MIMO market rather than, for example, provide a matrix conversion logic separately for the purpose of operationally connecting two modular MIMO signal processing units. In this example, the baseband processing logic 204 could be produced in a modular fashion, as well, possibly including other components of the system 200. Alternatively, it might make economic sense to provide modular matrix conversion logic and add modular MIMO signal processing units to it.

In a specific implementation, the MIMO signal processing units 212 can have an N×N configuration, even more specifically, N>2. As an example, where two 4×4 MIMO signal processing units are operationally connected with matrix conversion logic, it becomes possible to provide 8×8 extended MIMO operation. It may be noted that if a 2N×2N extended MIMO system is in wireless communication with an N×N MIMO system, the extended MIMO system may operate at reduced performance. For example, if an AP operating in 8×8 extended MIMO configuration with 2N (16, in this example) antennae is wirelessly connected to a station operating in 4×4 configuration, performance will not be at its peak because the AP will only be able to utilize a subset of antennae when receivers are less than receivers or transmitters, N (8, in this example) antennae instead of the full 16.

In a specific implementation, the MIMO signal processing units 212 can be designed for operation at 40 MHz. Typically, the operational frequency will remain the same in extended MIMO operation, in this example 40 MHz.

In the example of FIG. 2, output from the baseband processing logic 204 (from the MIMO signal processing units 212) is to the ADC/DAC component 206. The ADC/DAC component 206 will typically have two ADCs per signal (one for the i component and one for the q component of the signal). It may be possible to design an ADC such that multiple signal paths share an ADC, but this would be relatively unusual for an extended MIMO system. As a general rule, there is little economic incentive to attempt to reuse DAC components for different chains; they can be relatively inexpensively duplicated for each chain. However, ADC components are larger and more expensive. So there is more of an incentive to try to reuse ADC components if it is possible.

In the example of FIG. 2, the ADC/DAC component 206 is coupled to the adjustable state RF component 208. For an extended MIMO of N×N MIMO signal processing units 212, the adjustable state RF component 208 can have up to 2N RF chains active at once. The state controller 202 can generally dynamically adjust the adjustable state RF component 208 to enable RF chains to utilize a set of the antennae of the antennae array 210, as circumstances warrant. It may also be desirable to cause the system to operate in a dual bonded manner, particularly if increased throughput is desired, or in a dual concurrent manner. The dual operation states are described later with reference to FIGS. 3 and 4.

In the example of FIG. 2, the adjustable state RF component 208 is coupled to the antennae array 210. The antennae array 210 will typically have 2N antennae for an extended MIMO 2N×2N, though it is possible the system 200 could have more antennae than it can use for a particular baseband processing logic 204. For example, if the system 200 was designed for extended MIMO 2N×2N, but only had one N×N MIMO signal processing unit, the system 200 would then only utilize half of its antennae.

In the example of FIG. 2, in operation, the N×N MIMO signal processing units 212 operate together via the matrix conversion logic 214 as 2N×2N extended MIMO, and have a corresponding number of ADCs and DACs and RF chains through the adjustable state RF component 208, as limited by the parameters of the state. If the state is full extended MIMO, then 2N antennae of the antennae array 210 can be active, along with a corresponding number of ADCs and DACs and RF chains through the adjustable state RF component 208. If the state is limited extended MIMO (or no extended MIMO), then there will be fewer active ADCs and DACs and RF chains.

Figure 3:
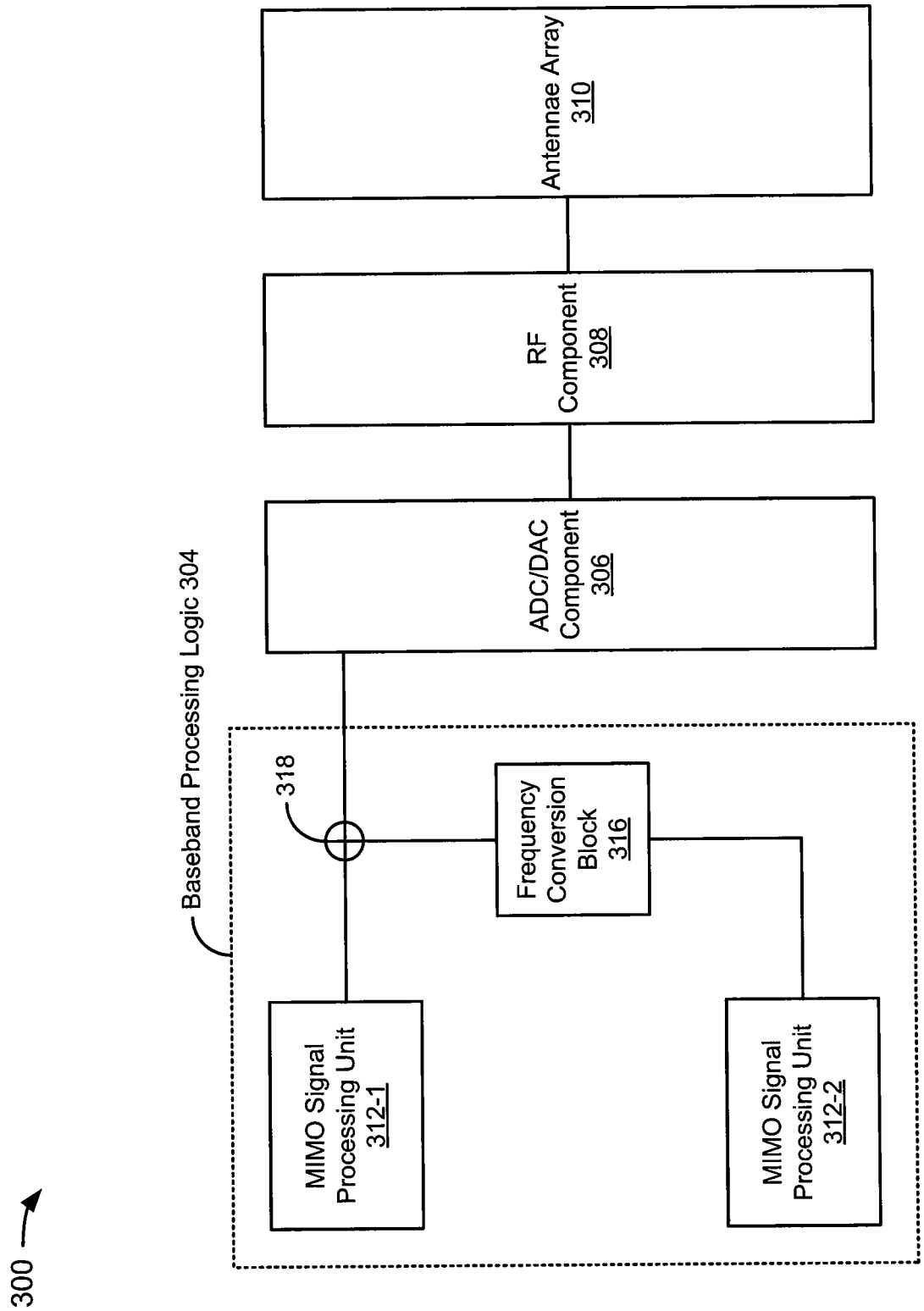
FIG. 3 depicts an example of a dual bonded MIMO system.

FIG. 3 depicts an example of a dual bonded MIMO system 300. The system 300 includes baseband processing logic 304, an ADC/DAC component 306, an RF component 308, and an antennae array 310. The dual bonded MIMO system 300 has some similarities to the extended MIMO system 200 (FIG. 2). Where similarities exist, some detail is omitted from this description.

In the example of FIG. 3, the baseband processing logic 304 includes a MIMO signal processing unit 312-1 and a MIMO signal processing unit 312-2 (collectively, the MIMO signal processing units 312) and a frequency conversion block 316. The MIMO signal processing units 312 can be the same as the MIMO signal processing units 212 (FIG. 2). The frequency conversion block 316, facilitates the combination of outputs from the signal processing units 312 at the adder 318. It may be noted that the frequency conversion can be in either direction, and need not be limited to one path.

In the example of FIG. 3, the ADC/DAC component 306 is similar to the ADC/DAC component 206 (FIG. 2). The RF component 308 can have N RF chains in association with N antennae in the antennae array 310, where the MIMO signal processing units are assumed to be N×N for illustrative purposes. Where the MIMO signal processing units are associated with x MHz operation, using this dual bonded system enables 2x MHz operation. For example, if the N×N MIMO signal processing units 312 operate at 40 MHz, the system 300 operates as an N×N MIMO at 80 MHz. Dual bonded operation is generally good for maximizing throughput. While in extended MIMO operation, it is possible for two clients with different numbers of antennae to communicate (albeit with reduced performance due to some antennae potentially being idle), a station operating at 80 MHz would not generally work to communicate with a station operating at 40 MHz.

Figure 4:
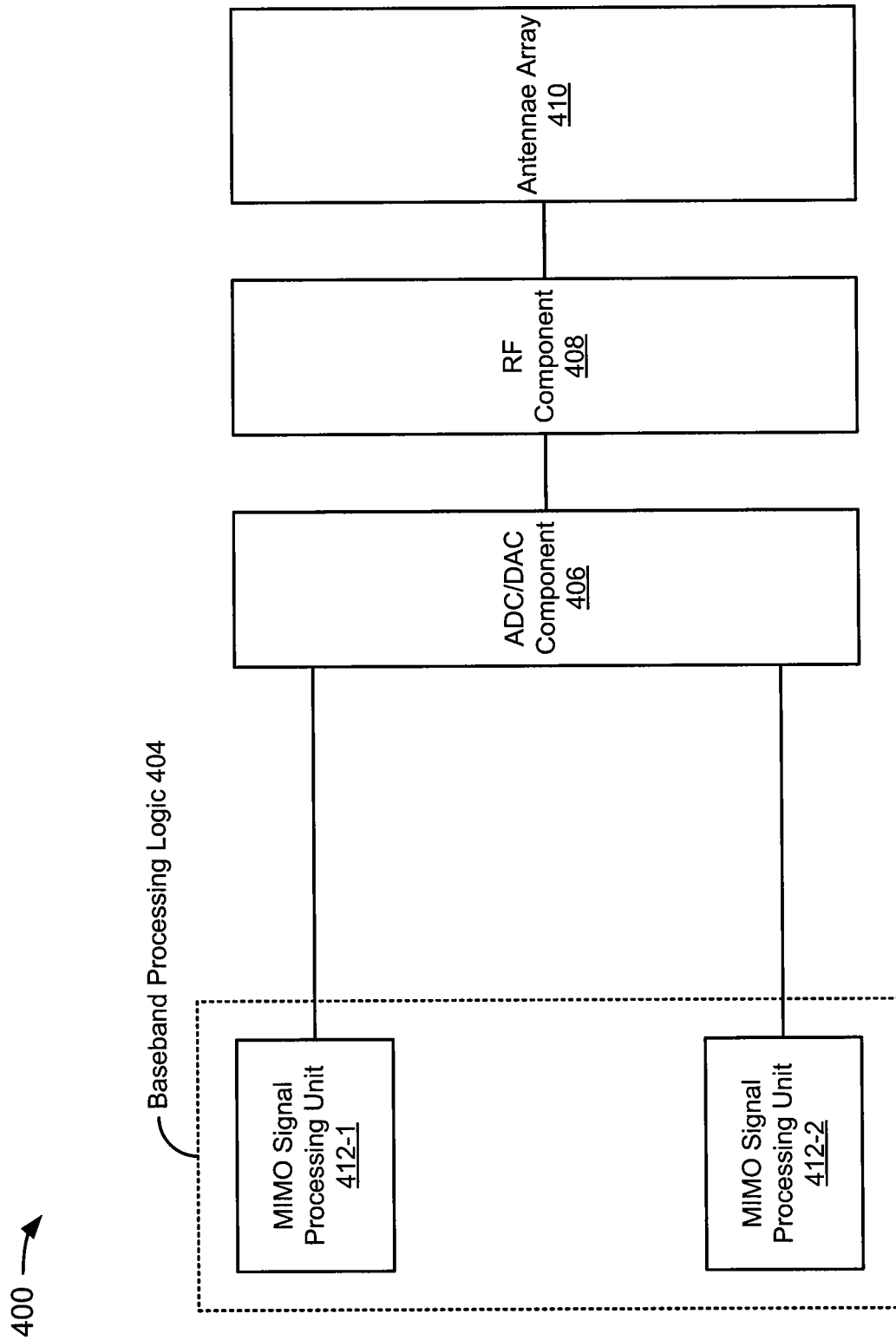
FIG. 4 depicts an example of a dual concurrent MIMO system.

FIG. 4 depicts an example of a dual concurrent MIMO system 400. The signals from the MIMO signal processing units 412 are output to ADC/DAC components 406 and RF component 408 in dual concurrent chains. A dual concurrent MIMO system often has separate hardware components and uses separate signal paths. The antennae array 410 can include two groups of N antennae each, where the MIMO signal processing units 412 are N×N for illustrative purposes, where a first group of antennae are associated with the MIMO signal processing unit 412-1 and a second group of antennae are associated with the MIMO signal processing unit 412-2.

It may be noted that in the example of FIG. 4, the entire path (ADC/DAC/RF/ . . . ) is functionally separated for each of the MIMO signal processing units 412; the paths can be on the same chip, but they process separate signals.

Figure 5:
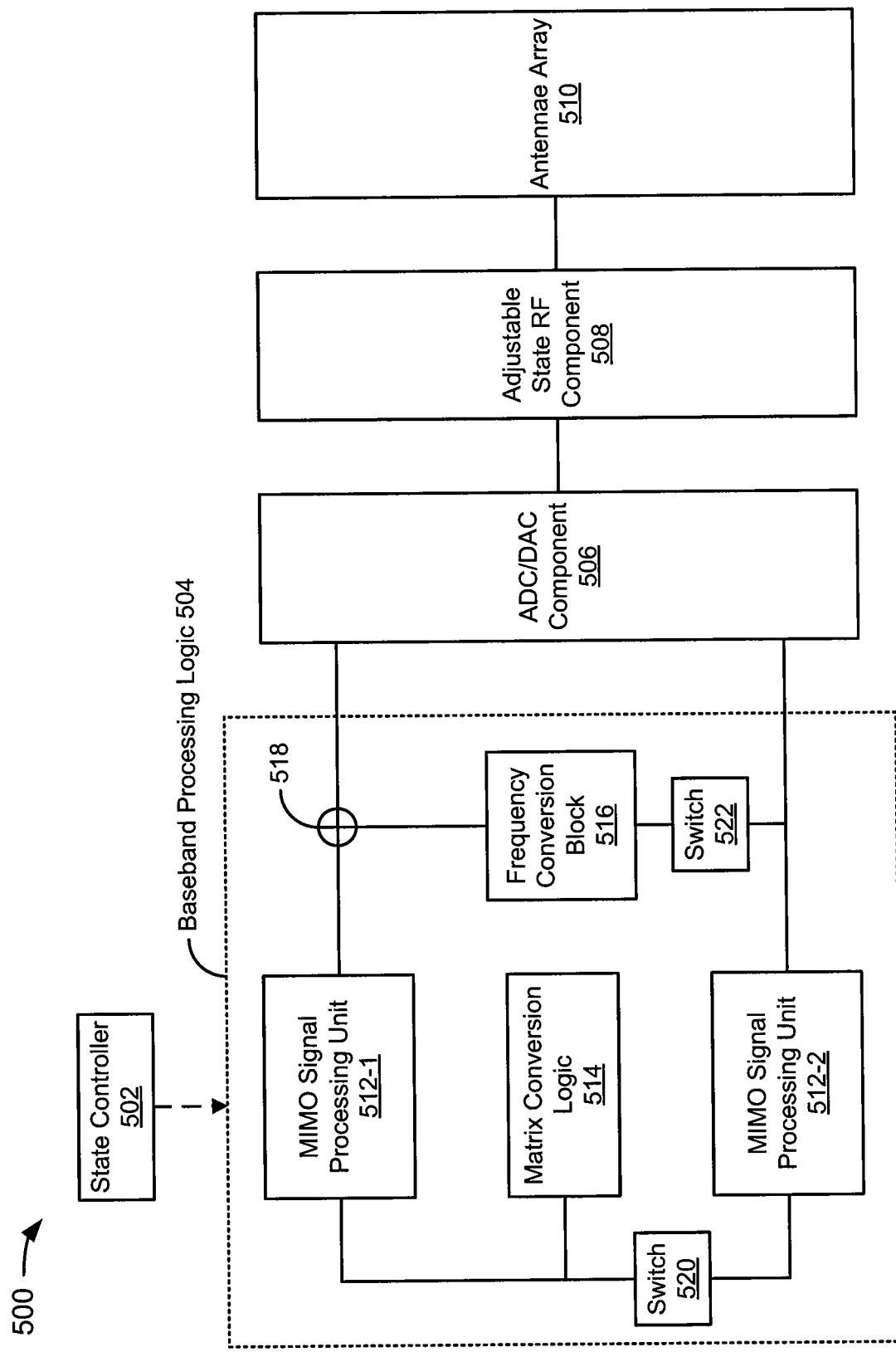
FIG. 5 depicts an example of a hybrid extended MIMO/dual system.

FIG. 5 depicts an example of a hybrid extended MIMO/dual system 500. In the example of FIG. 5, the system 500 includes a state controller 502, baseband processing logic 504, an ADC/DAC component 506, an adjustable state RF component 508, and an antennae array 510.

In the example of FIG. 5, the state controller 502 opens/closes switches based upon the operational state of the system 500. The configuration changes (e.g., between dual concurrent, extended MIMO, and dual bonded) can be done at manufacturing time, deployment time, or auto selected while in operation. The state controller 502 can be implemented in any applicable convenient fashion to accomplish the implementation goals.

In the example of FIG. 5, the baseband processing logic 504 includes a MIMO signal processing unit 512-1 and a MIMO signal processing unit 512-2 (collectively, the MIMO signal processing units 512), matrix conversion logic 514, a frequency conversion block 516, an adder 518, a switch 520, and a switch 522. In operation, if the switch 520 is closed, then the matrix conversion logic 514 operationally connects the MIMO signal processing units 512 for extended MIMO operation. In this example, the switch 522 would be open while the switch 520 is closed because there is no bonded extended MIMO operation described. Thus, when the switch 520 is closed and the switch 522 is open, the system 500 can be described as being in an extended MIMO operational state. In the extended MIMO operational state, the adjustable state RF component 508 can have 2N RF chains associated with 2N antennae of the antennae array 510, where for illustrative purposes the MIMO signal processing units are N×N.

In operation, if the switch 520 is open, then the system 500 is not in an extended MIMO operational state and is, instead, in a dual operational state. If the switch 522 is also open, then the MIMO signal processing units 512 are not coupled via the frequency conversion block 516 and the adder 518. The system can be described as being in a dual concurrent operational state. In the dual concurrent operational state, the adjustable state RF component 508 can have N RF chains associated with the MIMO signal processing unit 512-1 and a first group of N antennae of the antennae array 510, and N RF chains associated with the MIMO signal processing unit 512-2 and a second group of N antennae of the antennae array 510, where for illustrative purposes the MIMO signal processing units are N×N.

In operation, if the switch 520 is open and the switch 522 is closed, then the MIMO signal processing units 512 are operationally connected via the frequency conversion block 516 and the adder 518. The system can be described as being in a dual bonded operational state. In dual bonded operational state, the adjustable state RF component 508 can have N RF chains associated with N antennae of the antennae array 510. However, where the MIMO signal processing units 512 operated at x MHz individually, the system 500 can operate at 2x MHz.

Some components, such as ADCs in the ADC component 506 may be used differently in different states. For example, extended MIMO and dual concurrent states have twice as many RF chains as in the dual bonded state. So the system could include N ADCs, one for each path in the dual bonded state, but the ADCs might have to work twice as hard in extended MIMO and dual concurrent states because they are shared by more than one path.

In an alternative embodiment, the matrix conversion logic 514 and the switch 520 can be omitted. A system without these components operates in much the same manner as described above where the switch 520 is open. That is, the system can have dual bonded and dual concurrent operational states.

Figure 6:
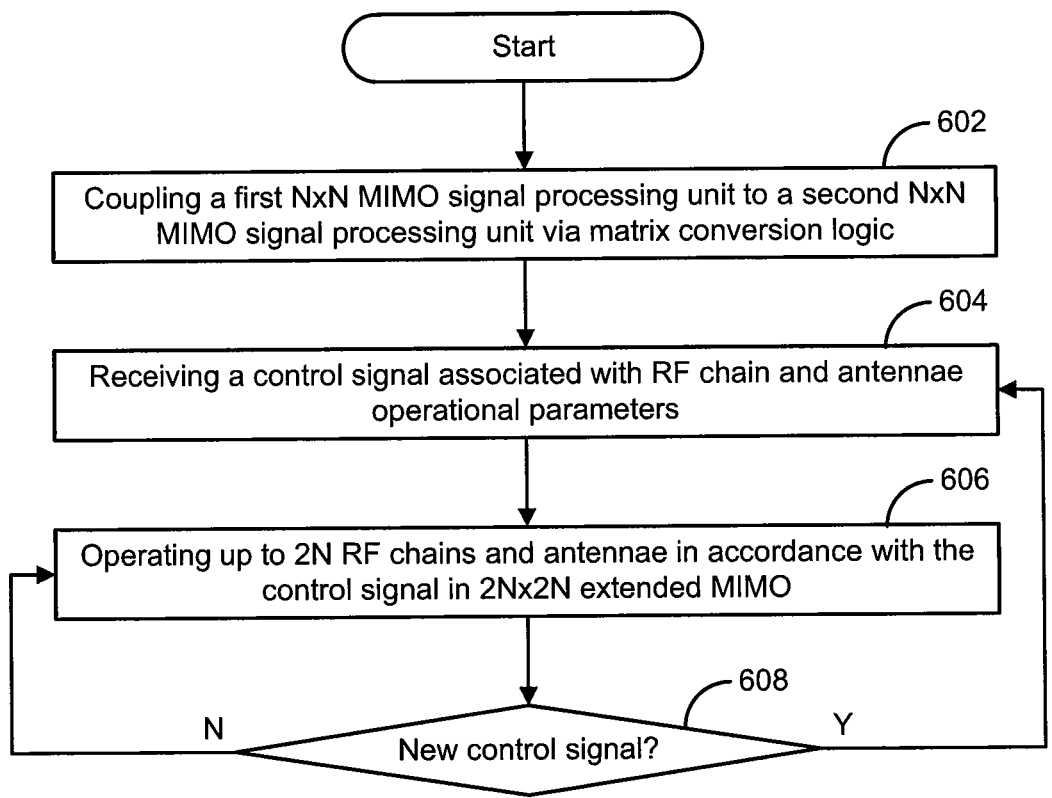
FIG. 6 depicts a flowchart of an example of a method for operating two 4×4 MIMO signal processing units as 8×8 extended MIMO.

FIG. 6 depicts a flowchart 600 of an example of a method for operating two 4×4 MIMO signal processing units as 8×8 extended MIMO. This method and other methods are depicted as serially arranged modules. However, modules of the methods may be reordered, or arranged for parallel execution as appropriate.

In the example of FIG. 6, the flowchart 600 starts at block 602 with coupling a first N×N MIMO signal processing unit to a second N×N MIMO signal processing unit via matrix conversion logic.

In the example of FIG. 6, the flowchart 600 continues to block 604 with receiving a control signal associated with RF chain and antennae operational parameters. The control signal may be associated with using a subset of antennae in certain conditions. In a specific embodiment, the control signal may be associated with changing to a dual operational state.

In the example of FIG. 6, the flowchart 600 continues to block 606 with operating up to 2N RF chains and antennae in accordance with the control signal in 2N×2N extended MIMO. In a specific embodiment, N>2. For example, 4, 6, 8, 12, or 16. Higher numbers may be possible, but using current technology, anything over 16 is exceptionally difficult to accomplish because channels become too correlated to carry distinct data.

In the example of FIG. 6, the flowchart 600 continues to decision point 608 where it is determined whether a new control signal has been received. If it is determined that a new control signal has been received, the flowchart 600 returns to block 604 and continues as described previously. If, on the other hand, it is determined that a new control signal has not been received, the flowchart 600 returns to block 606 and continues as described previously.

Figure 7:
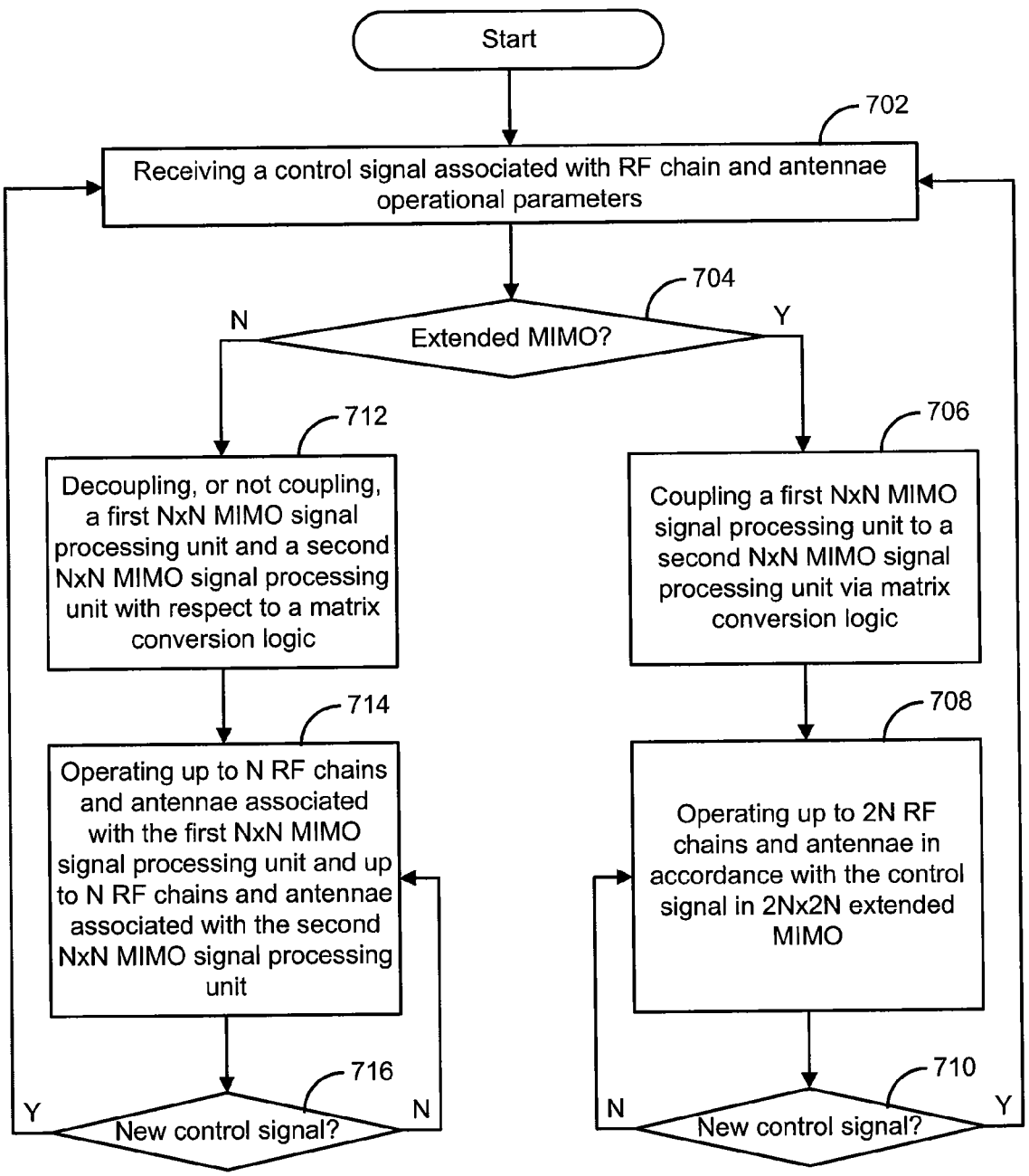
FIG. 7 depicts a flowchart of an example of a method for alternately operating a wireless station in an extended MIMO state and a dual concurrent state.

FIG. 7 depicts a flowchart 700 of an example of a method for alternately operating a wireless station in an extended MIMO state and a dual concurrent state.

In the example of FIG. 7, the flowchart 700 starts at block 702 with receiving a control signal associated with RF chain and antennae operational parameters. The control signal may be associated with using a subset of antennae in certain conditions. In a specific embodiment, the control signal may be associated with changing to a dual operational state.

In the example of FIG. 7, the flowchart 700 continues to decision point 704 where it is determined whether the control signal is associated with extended MIMO. If it is determined that the control signal is associated with extended MIMO (704-Y), then the flowchart 700 continues to block 706 with coupling a first N×N MIMO signal processing unit to a second N×N MIMO signal processing unit via matrix conversion logic, to block 708 with operating up to 2N RF chains and antennae in accordance with the control signal in 2N×2N extended MIMO, and to decision point 710 where it is determined whether a new control signal has been received. If it is determined that a new control signal has been received (710-Y), then the flowchart 700 returns to block 702 and continues as described previously. If, on the other hand, it is determined that a new control signal has not been received (710-N), then the flowchart 700 returns to block 708 and continues as described previously.

If it is determined that the control signal is not associated with extended MIMO (704-N), then the flowchart 700 continues to block 712 with decoupling, or not coupling, a first N×N MIMO signal processing unit and a second N×N MIMO signal processing unit with respect to a matrix conversion logic. If a control signal was not previously received that was indicative of extended MIMO, then the N×N MIMO signal processing units will not have been coupled; so they are not coupled. However, if a control signal was previously received that was indicative of extended MIMO, then the N×N MIMO signal processing units will be decoupled. In any case, the flowchart 700 continues to block 714 with operating up to N RF chains and antennae associated with the first N×N MIMO signal processing unit and up to N RF chains and antennae associated with the second N×N MIMO signal processing unit. The flowchart 700 continues to decision point 716 where it is determined whether a new control signal has been received. If it is determined that a new control signal has been received (716-Y), the flowchart 700 returns to block 702 and continues as described previously. If, on the other hand, it is determined that a new control signal has not been received (716-N), the flowchart 700 returns to block 714 and continues as described previously.

Figure 8:
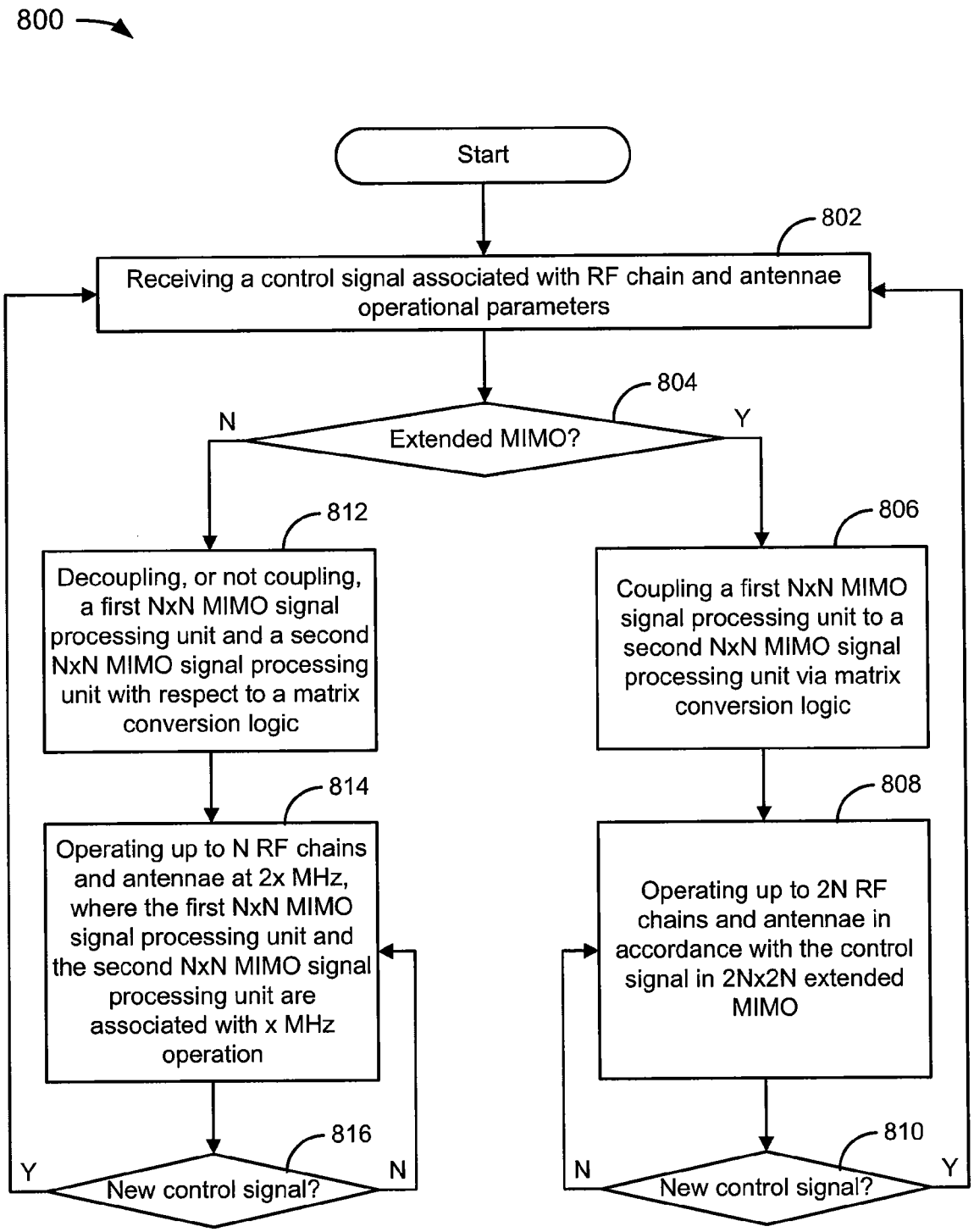
FIG. 8 depicts a flowchart of an example of a method for alternately operating a wireless station in an extended MIMO state and a dual bonded state.

FIG. 8 depicts a flowchart 800 of an example of a method for alternately operating a wireless station in an extended MIMO state and a dual bonded state.

In the example of FIG. 8, the flowchart 800 starts at block 802 with receiving a control signal associated with RF chain and antennae operational parameters. The control signal may be associated with using a subset of antennae in certain conditions. In a specific embodiment, the control signal may be associated with changing to a dual operational state.

In the example of FIG. 8, the flowchart 800 continues to decision point 804 where it is determined whether the control signal is associated with extended MIMO. If it is determined that the control signal is associated with extended MIMO (804-Y), then the flowchart 800 continues to block 806 with coupling a first N×N MIMO signal processing unit to a second N×N MIMO signal processing unit via matrix conversion logic, to block 808 with operating up to 2N RF chains and antennae in accordance with the control signal in 2N×2N extended MIMO, and to decision point 810 where it is determined whether a new control signal has been received. If it is determined that a new control signal has been received (810-Y), then the flowchart 800 returns to block 802 and continues as described previously. If, on the other hand, it is determined that a new control signal has not been received (810-N), then the flowchart 800 returns to block 808 and continues as described previously.

If it is determined that the control signal is not associated with extended MIMO (804-N), then the flowchart 800 continues to block 812 with decoupling, or not coupling, a first N×N MIMO signal processing unit and a second N×N MIMO signal processing unit with respect to a matrix conversion logic. The flowchart 800 continues to block 814 with operating up to N RF chains and antennae at 2x MHz where the first N×N MIMO signal processing unit and the second N×N MIMO signal processing unit are associated with x MHz operation. In this way, two N×N MIMO signal processing units that operate at, say, 40 MHz, and be combined to operate at 80 MHz. The flowchart 800 continues to decision point 816 where it is determined whether a new control signal has been received. If it is determined that a new control signal has been received (816-Y), the flowchart 800 returns to block 802 and continues as described previously. If, on the other hand, it is determined that a new control signal has not been received (816-N), the flowchart 800 returns to block 814 and continues as described previously.

Figure 9:
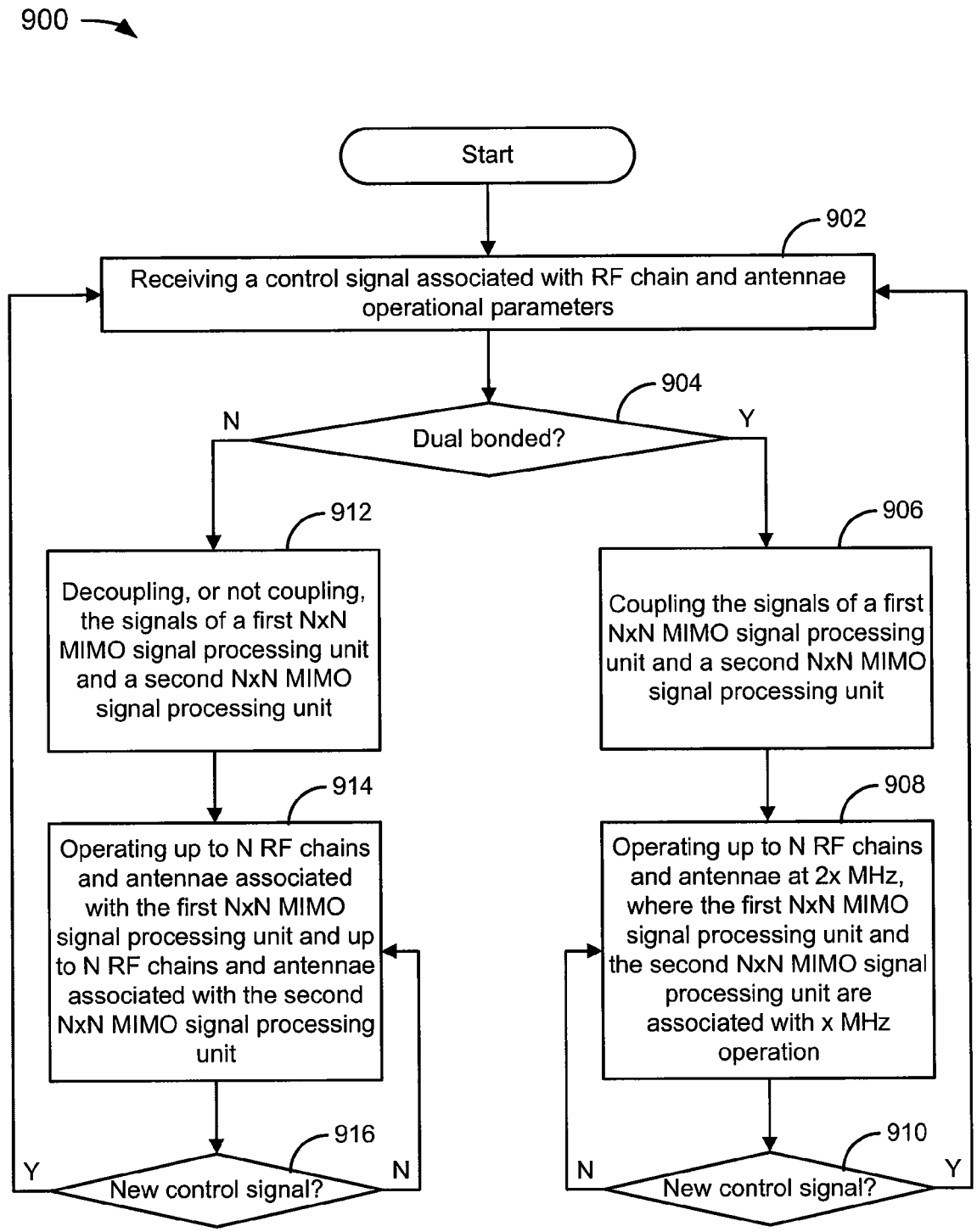
FIG. 9 depicts a flowchart of an example of a method for alternately operating a wireless station in a dual concurrent state and a dual bonded state.

FIG. 9 depicts a flowchart 900 of an example of a method for alternately operating a wireless station in a dual concurrent state and a dual bonded state.

In the example of FIG. 9, the flowchart 900 starts at block 902 with receiving a control signal associated with RF chain and antennae operational parameters. The control signal may be associated with using a subset of antennae in certain conditions. In a specific embodiment, the control signal may be associated with changing to a dual operational state.

In the example of FIG. 9, the flowchart 900 continues to decision point 904 where it is determined whether the control signal is associated with dual bonded operation. If it is determined that the control signal is associated with dual bonded operation (904-Y), then the flowchart 900 continues to block 906 with coupling the signals of a first N×N MIMO signal processing unit and a second N×N MIMO signal processing unit, to block 908 with operating up to N RF chains and antennae at 2x MHz, where the first N×N MIMO signal processing unit and the second N×N MIMO signal processing unit are associated with x MHz operation, and to decision point 910 where it is determined whether a new control signal has been received. If it is determined that a new control signal has been received (910-Y), then the flowchart 900 returns to block 902 and continues as described previously. If, on the other hand, it is determined that a new control signal has not been received (910-N), then the flowchart 900 returns to block 908 and continues as described previously.

If it is determined that the control signal is not associated with dual bonded operation (904-N), then the flowchart 900 continues to block 912 with decoupling, or not coupling, the signals of a first N×N MIMO signal processing unit and a second N×N MIMO signal processing unit. If a control signal was not previously received that was indicative of dual bonded operation, then the N×N MIMO signals will not have been coupled; so they are not coupled. However, if a control signal was previously received that was indicative of dual bonded operation, then the signals will be decoupled. In any case, the flowchart 900 continues to block 914 with operating up to N RF chains and antennae associated with the first N×N MIMO signal processing unit and up to N RF chains and antennae associated with the second N×N MIMO signal processing unit. The flowchart 900 continues to decision point 916 where it is determined whether a new control signal has been received. If it is determined that a new control signal has been received (916-Y), the flowchart 900 returns to block 902 and continues as described previously. If, on the other hand, it is determined that a new control signal has not been received (916-N), the flowchart 900 returns to block 914 and continues as described previously.

Figure 10:
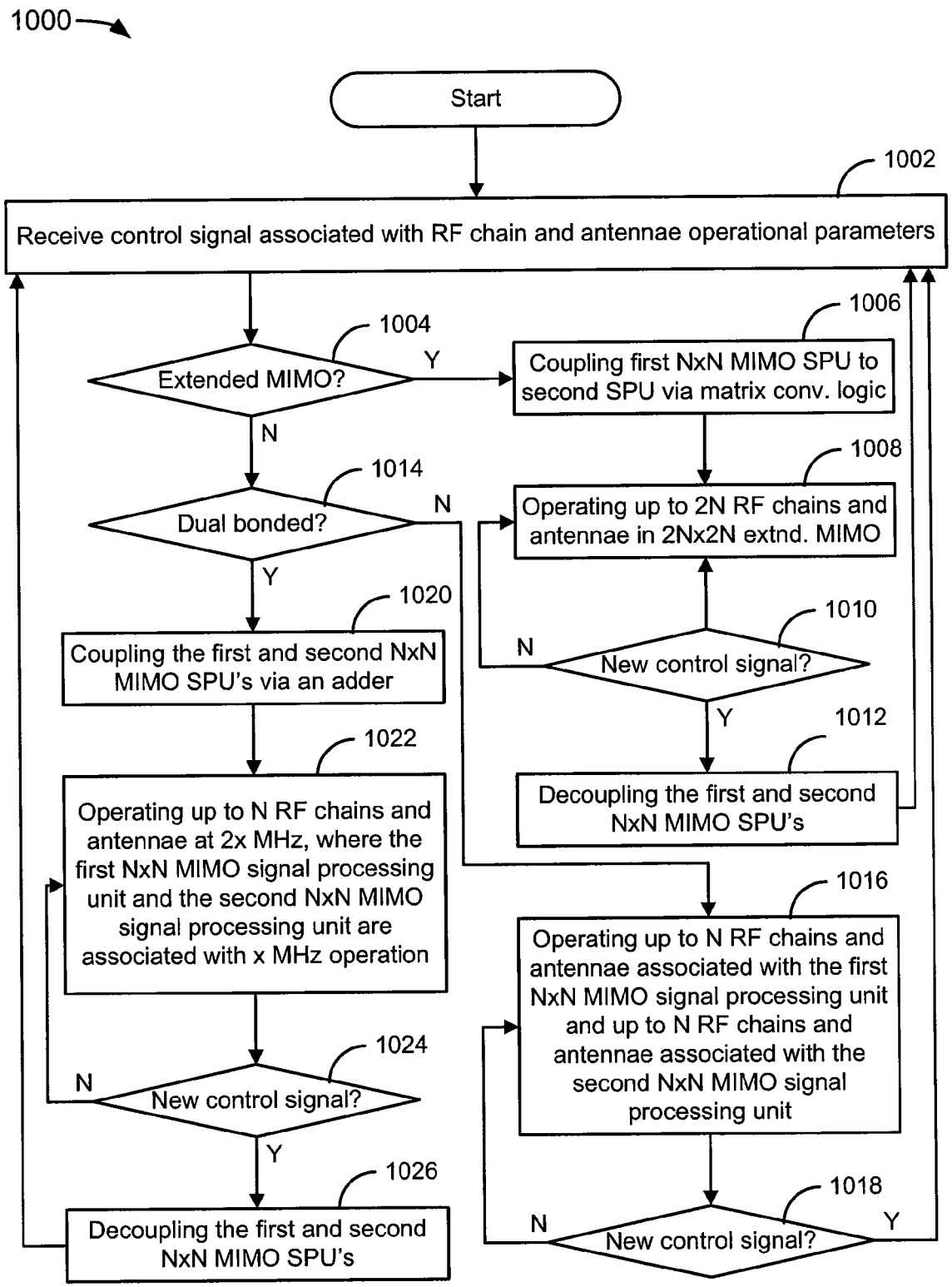
FIG. 10 depicts a flowchart of an example of a method for alternately operating a wireless station in an extended MIMO state, a dual concurrent state, and a dual bonded state.

FIG. 10 depicts a flowchart 1000 of an example of a method for alternately operating a wireless station in an extended MIMO state, a dual concurrent state, and a dual bonded state. In the example of FIG. 10, the flowchart 1000 starts at block 1002 with receiving a control signal associated with RF chain and antennae operational parameters.

In the example of FIG. 10, the flowchart 1000 continues to decision point 1004 where it is determined whether the control signal is associated with extended MIMO. If it is determined that the control signal is associated with extended MIMO (1004-Y), then the flowchart 1000 continues to block 1006 with coupling a first N×N MIMO signal processing unit to a second N×N MIMO signal processing unit via matrix conversion logic, to block 1008 with operating up to 2N RF chains and antennae in accordance with the control signal in 2N×2N extended MIMO, to decision point 1010 where it is determined whether a new control signal has been received. If it is determined that a new control signal has not been received (1010-N), then the flowchart 1000 returns to block 1008 and continues as described previously. If, on the other hand, it is determined that a new control signal has been received (1010-N), then the flowchart 1000 continues to block 1012 with decoupling the first and second N×N MIMO signal processing units. The signal processing units are decoupled because no other operational states that couple the N×N MIMO signal processing units via matrix conversion logic are depicted; if there were other such operational states, the first and second N×N MIMO signal processing units could be decoupled at some other time after determining that the decoupling is needed. Finally, the flowchart 1000 returns to block 1002 as described previously.

If it is determined that the control signal is not associated with extended MIMO (1004-N), then the flowchart 1000 continues to decision point 1014 where it is determined whether the control signal is associated with dual bonded operation. If it is determined that the control signal is not associated with dual bonded operation (1014-N), then the flowchart 1000 continues to block 1016 with operating up to N RF chains and antennae associated with the first N×N MIMO signal processing unit and up to N RF chains and antennae associated with the second N×N MIMO signal processing unit, which is assumed for the purposes of this example to be a dual concurrent operating state. The flowchart 1000 continues to decision point 1018 where it is determined whether a new control signal has been received. If it is determined that a new control signal has been received (1018-Y), the flowchart 1000 returns to block 1002 and continues as described previously. If, on the other hand, it is determined that a new control signal has not been received (1018-N), the flowchart 1000 returns to block 1016 and continues as described previously.

If it is determined that the control signal is associated with dual bonded operation (1014-Y), then the flowchart 1000 continues to block 1020 with coupling the first N×N MIMO signal processing unit and the second N×N MIMO signal processing unit via an adder. In a specific implementation, the first and second N×N MIMO signal processing units are also coupled together via a frequency conversion block. In the example of FIG. 10, the flowchart 1000 continues to block 1022, with operating up to N RF chains and antennae at 2x MHz, where the first N×N MIMO signal processing unit and the second N×N MIMO signal processing unit are associated with x MHz operation, and to decision point 1024 where it is determined whether a new control signal has been received. If it is determined that a new control signal has not been received (1024-N), then the flowchart 1000 returns to block 1022 and continues as described previously. If, on the other hand, it is determined that the new control signal has been received (1024-Y), then the flowchart 1000 continues to block 1026 with decoupling the first and second N×N MIMO signal processing units and returns to block 1002 and continues as described previously.

Systems described herein may be implemented on any of many possible hardware, firmware, and software systems. Algorithms described herein are implemented in hardware, firmware, and/or software, which is implemented in hardware. The specific implementation is not critical to an understanding of the techniques described herein and the claimed subject matter.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

The invention claimed is:

1. A system comprising:
   a state controller;
   baseband processing logic, coupled to the state controller, including:
   a plurality of multiple input multiple output (MIMO) signal processing units;
   matrix conversion logic coupled to the plurality of MIMO signal processing units;
   an adjustable state radio frequency (RF) component coupled to the baseband processing logic;
   a plurality of antennae coupled to the adjustable state RF component;
   wherein, in operation, the baseband processing logic controls the adjustable RF component to utilize the plurality of antennae and RF chains associated with the antennae within parameters defined by the state controller.

2. The system of claim 1, further comprising an ADC/DAC module coupled between the plurality of MIMO signal processing units and the adjustable state RF component.

3. The system of claim 1, further comprising a modularized MIMO block including a first MIMO signal processing unit of the plurality of MIMO signal processing units.

4. The system of claim 3, further comprising a connection port coupling the modularized MIMO block to a second MIMO signal processing unit of the plurality of MIMO signal processing units.

5. The system of claim 1, further comprising modularized baseband processing logic including the baseband processing logic.

6. The system of claim 1, further comprising modularized matrix conversion logic including the matrix conversion logic.

7. The system of claim 1, further comprising a frequency conversion block, wherein, in operation, the frequency conversion block facilitates the combination of a first signal associated with a first MIMO signal processing unit of the plurality of MIMO signal processing units with a second signal associated with a second MIMO signal processing unit of the plurality of MIMO signal processing units.

8. The system of claim 7, further comprising an adder for combining the first signal and the second signal.

9. The system of claim 7, further comprising is switch coupled to the frequency conversion block that, when closed in operation, causes the baseband processing logic to enter a bonded transmission state.

10. The system of claim 1, further comprising a switch coupled to the matrix conversion logic that, when open in operation, causes the baseband processing logic to enter a dual transmission state.

11. The system of claim 1, wherein the plurality of antennae are coupled to an access point (AP), and wherein the antennae transmit or receive signals to or from a station.

12. The system of claim 11, wherein the station that is in a dual bonded operational state.

13. The system of claim 11, wherein the station that is in a dual concurrent operational state.

14. The system of claim 11, wherein the station that is in an extended MIMO operational state.

15. A method comprising:
   receiving a control signal associated with radio frequency (RF) chain and antennae operational parameters;
   coupling a first N×N multiple input multiple output (MIMO) signal processing unit to a second N×N MIMO signal processing unit via matrix conversion logic, wherein N>2;
   operating up to 2N RF chains and antennae in accordance with the control signal in 2N×2N extended MIMO; and,
   wherein the control signal is a first control signal, further comprising:
   receiving a second control signal associated with dual operational state;
   decoupling the first N×N MIMO signal processing unit and the second N×N MIMO signal processing unit with respect to the matrix conversion logic.

16. A method comprising:
   receiving a control signal associated with radio frequency (RF) chain and antennae operational parameters;
   coupling a first N×N multiple input multiple output (MIMO) signal processing unit to a second N×N MIMO signal processing unit via matrix conversion logic, wherein N>2;
   operating up to 2N RF chains and antennae in accordance with the control signal in 2N×2N extended MIMO; and,
   wherein the control signal is a first control signal, further comprising:
   receiving a second control signal associated with dual concurrent operational state;
   operating up to N RF chains and antennae associated with the first N×N MIMO signal processing unit and up to N RF chains and antennae associated with the second N×N MIMO signal processing unit.

17. A method comprising:
   receiving a control signal associated with radio frequency (RF) chain and antennae operational parameters;
   coupling a first N×N multiple input multiple output (MIMO) signal processing unit to a second N×N MIMO signal processing unit via matrix conversion logic, wherein N>2;
   operating, up to 2N RF chains and antennae in accordance with the control signal in 2N×2N extended MIMO; and,
   wherein the control signal is a first control signal, further comprising:
   receiving a second control signal associated with dual bonded operational state;
   coupling the first N×N MIMO signal processing unit and the second N×N MIMO signal processing unit with an adder;
   operating up to N RF chains and antennae at 2x MHz, where "x" is an operational frequency of each of the first and the second MIMO signal processing unit.

18. The method of claim 17, further comprising:
   decoupling the first N×N MIMO signal processing unit id the second N×N MIMO signal processing unit with respect to the adder.

19. A system comprising:
   a state controller;
   baseband processing logic, coupled to the state controller, including:
   a plurality of multiple input multiple output (MIMO) signal processing units;
   an adder coupled to a first MIMO signal processing unit of the plurality of MIMO signal processing units;
   a switch coupled to a second MIMO signal processing unit of the plurality of MIMO signal processing units;

a frequency conversion block coupled between the adder and the switch;

an adjustable state radio frequency (RF) component coupled to the baseband processing logic;

a plurality of antennae coupled to the adjustable state RF component;

wherein, in operation, when the state controller provides a control signal to open the switch, the baseband processing logic enters a dual concurrent operational state, and when the state controller provides a control signal to close the switch, signals associated with the first MIMO signal processing unit and the second MIMO signal processing unit are combined using the frequency conversion block and the adder, and the baseband processing logic enters a dual bonded operational state, and wherein the baseband processing logic controls the adjustable RF component to utilize the plurality of antennae and RF chains associated with the antennae in accordance with the dual bonded or dual concurrent operational states.

* * * * *